(12) United States Patent
Liphardt

(10) Patent No.: US 8,749,785 B2
(45) Date of Patent: *Jun. 10, 2014

(54) OPERATION OF AN ELECTROMAGNETIC RADIATION FOCUSING ELEMENT

(71) Applicant: J.A. Woollam Co, Inc., Lincoln, NE (US)

(72) Inventor: Martin M. Liphardt, Lincoln, NE (US)

(73) Assignee: J.A. Woolam Co., Inc., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/694,658

(22) Filed: Dec. 26, 2012

(65) Prior Publication Data

US 2013/0163099 A1    Jun. 27, 2013

Related U.S. Application Data

(63) Continuation-in-part of application No. 12/661,974, filed on Mar. 25, 2010, now Pat. No. 8,351,036.

(60) Provisional application No. 61/211,055, filed on Mar. 26, 2009.

(51) Int. Cl.
*G01J 4/00* (2006.01)
*G01J 3/02* (2006.01)
*G02B 27/58* (2006.01)

(52) U.S. Cl.
CPC ............... *G01J 4/00* (2013.01); *G01J 3/0229* (2013.01); *G01J 3/0208* (2013.01); *G02B 27/58* (2013.01)
USPC ........................................................ 356/369

(58) Field of Classification Search
CPC ............. G01J 4/04; G02B 21/00; G02B 9/08; G02B 27/09; G02B 27/0938; G02B 27/0955
USPC ............ 250/458.1, 459.1; 356/317, 318, 364, 356/365, 366, 367, 368, 369, 417; 359/368, 359/385, 738, 740
See application file for complete search history.

(56) References Cited

U.S. PATENT DOCUMENTS 8,351,036 B1 * 1/2013 Liphardt ........................ 356/369

* cited by examiner

*Primary Examiner* — David N Spector
(74) *Attorney, Agent, or Firm* — James D. Welch

(57) ABSTRACT

A combination of a focusing element, and a filtering element which naturally adjusts the cross-sectional area of a beam of electromagnetic radiation passed through the focusing element as a function of wavelength, optionally as an element of an ellipsometer or polarimeter system.

39 Claims, 6 Drawing Sheets

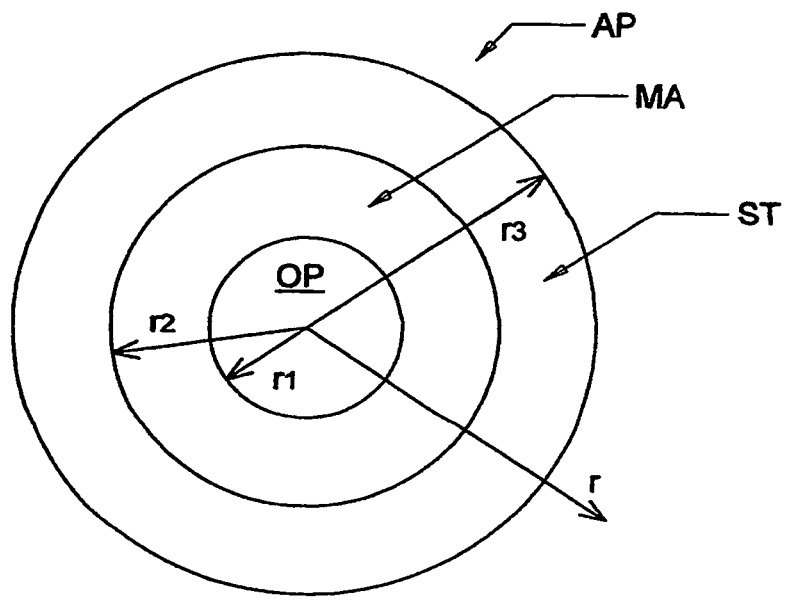
FIG. 1a₁
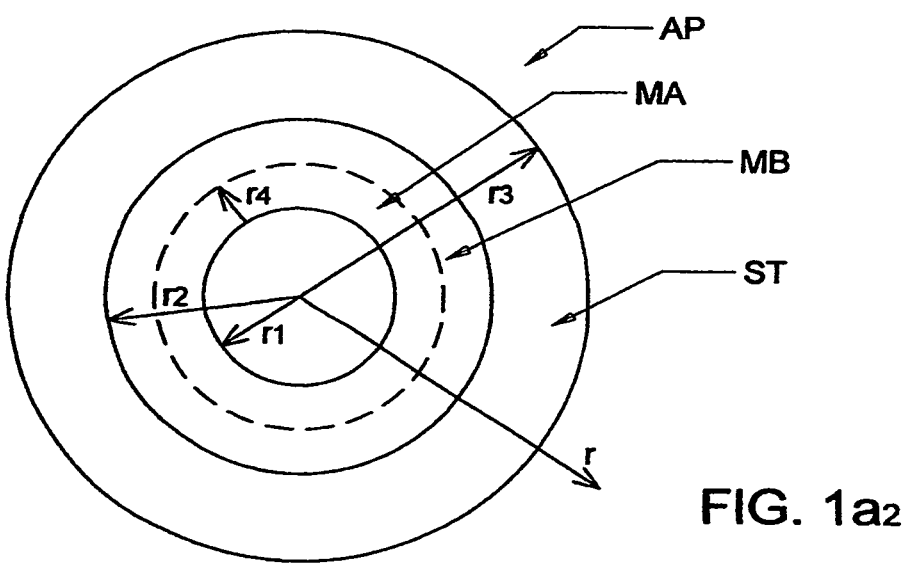
FIG. 1a₂

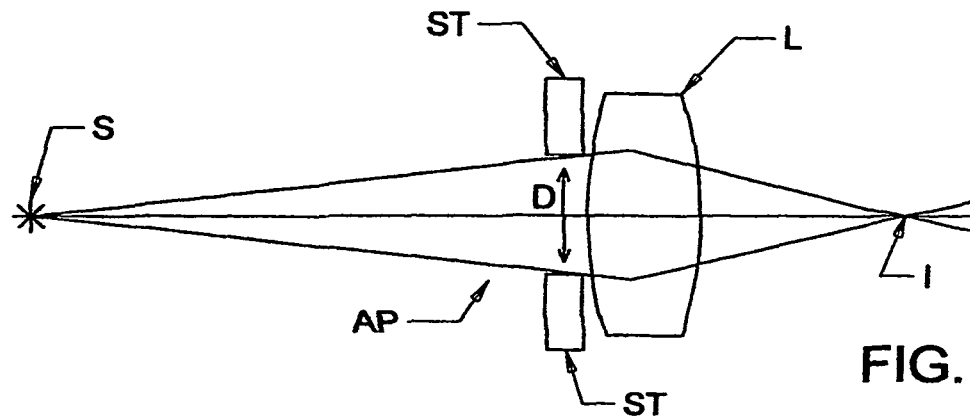
FIG. 2a₁
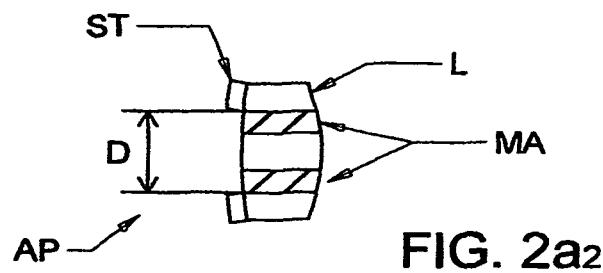
FIG. 2a₂
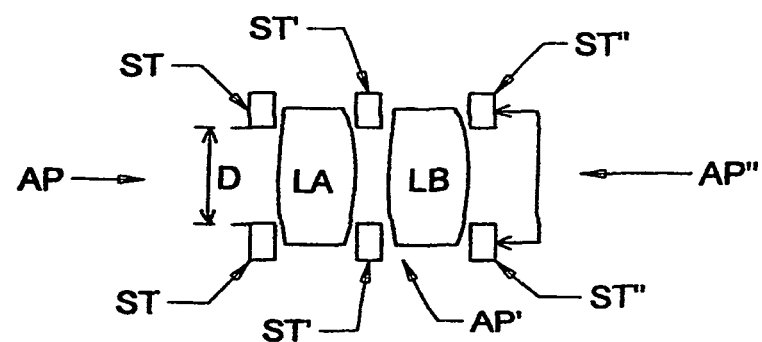
FIG. 2a₃

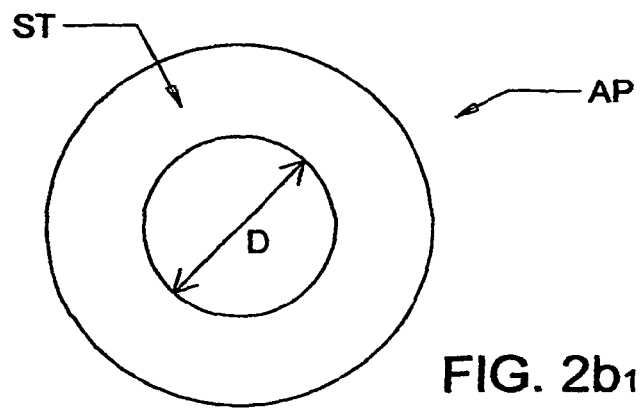
FIG. 2b₁
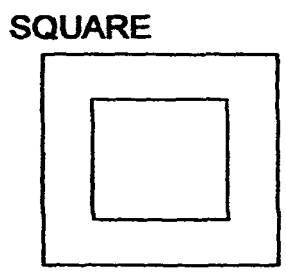
SQUARE
FIG. 2b₂
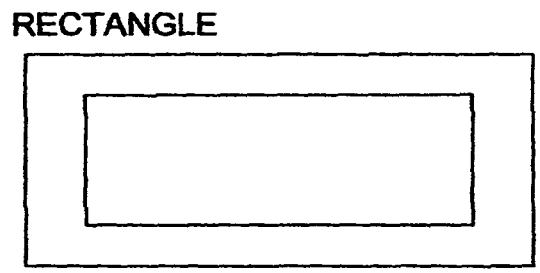
RECTANGLE
FIG. 2b₃
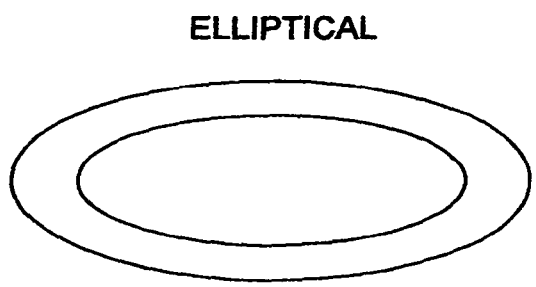
ELLIPTICAL
FIG. 2b₄
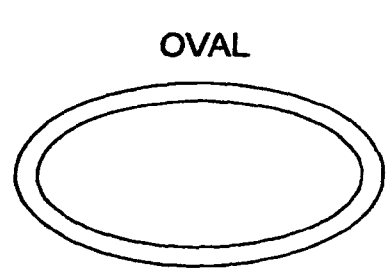
OVAL
FIG. 2b₅

OPERATION OF AN ELECTROMAGNETIC RADIATION FOCUSING ELEMENT

This application is a CIP of application Ser. No. 12/661,974 Filed Mar. 25, 2010, and therevia Claims Benefit of 61/211,055 filed Mar. 26, 2009.

TECHNICAL FIELD

The present invention relates to a system of aperturing a focusing element by use of a filtering element to arrive at an optimum electromagnetic beam cross-sectional area passed by the filtering element, based on optimizing said cross-sectional area in view of conflicting effects of aberration and diffraction inherent in said focusing element, which, for each wavelength, vary oppositely to one another with electromagnetic beam cross-sectional area. More particularly the present invention is a combination of a focusing element, and a filtering element which improves the operation of the focusing element as a function of wavelength in a beam of electromagnetic radaition.

BACKGROUND

It is known that focusing element, such as refractive lenses and lens systems, cause both diffraction and aberration to occur in a beam of electromagnetic radiation with which is interacts. It is also known that when the effective diameter of a beam of electromagnetic radiation which impinges on a focusing element is adjusted, the effects of diffraction and of aberration are affected oppositely. That is, as the beam cross-sectional area is increased, the effects of diffraction decrease, but the effects of aberration increase. This leads to a realization that, for each wavelength in the beam, there should be a beam cross-sectional area such that the focusing lens performs "optimally". That is, there exists a cross-section area such that increase or decrease in cross-sectional area will cause combined diffraction or aberration to become worse, (ie. cause lens performance to be worse).

It is also well known that attenuation of the intensity of a beam of electomagnetic radiation which is caused to pass through a material is related to the extinction coefficient and thickness of the material via Beer's Law:

$$Io = Ii(e^{-\alpha T}).$$

Therefore, either an increase in the value of extinction coefficient $\alpha$, or a greater thickness (T) of a material, or a combination of both, can cause a greater attenuation of input intensity (Ii) of components of a beam of electomagnetic radiation which passes through a lens. This is to be contrasted with the situation where input Intensity (Ii) is attenuated by reflection or scattering from a surface of an aperture forming material. Further, it is noted that "reflection" implies a specular condition wherein an angle of incidence of an input beam of electromagnetic radiation component is equal to an angle of reflection; whereas "scattering", while still indicating a deflection of a component of an electromagnetic beam away from transmission through a lens, does not have such a limitation on the angle at which a beam component is deflected.

With the present invention in mind a computer search for Patents and Published Applications was conducted. A few references were identified which are interesting as they relate to aberration corrections. For instance, a Patent to Lee et al., U.S. Pat. No. 6,994,808 describes a planar lens which is designed to compensate chromatic aberration. Another Patent to Kimura, U.S. Pat. No. 6,865,025 provides another optical element for application in compensating aberration. And, a Published Patent Application by Miller et al., No. 2004/0032664 describes a color corrected lens. Other Patents and Published Applications identified are:

Published Applications:
  2009/0322928;
  2009/0108190;
  2006/0164734;
  2005/0247866;
Patents:
  U.S. Pat. Nos. 7,495,762; 7,281,921; 7,248,420;
  7,274,472; 7,190,525; 5,336,885;
  7,251,410; 7,070,405; 4,832,464;
  6,824,813; 7,027,156; 4,650,279.
  6,449,028; 6,916,584;
  5,889,593; 6,277,938;

The above cited Patents are not considered to be particularly relevant to a focusing element that optimisms its optical response regarding aberration v. diffraction on a per wavelength basis.

It is also well known that various materials and stacks of materials or the like have different Transmission v. wavelength characteristics. Patents known by the Inventor herein which are relevant are: U.S. Pat. Nos. 7,239,391; 7,295,313; 6,940,595; and 6,636,309. However, while said general knowledge that stacked materials present with specific response to different wavelengths exists, application of the effect as taught in the present Application is not found in the known prior art. This is particularly the case where application of aperturing and focusing of electromagnetic beams by a present invention system for improving the operation of a focusing element as a function of wavelength is applied in an ellipsometer, polarimeter or the like system.

In the parent Application the Examiner cited Japanese Patent Application JP 2003-091862 by Kitabayashi, in view of Yamamoto et al. 2004/0085882. The Kibabayashi 501 reference describes processing two laser beams of electromagnetic radiation in a CD-DVD system, said two beam being provided by solid state laser sources. Said two laser beams, however, are elliptical in cross-sectional shape as they exit the sources thereof, which is not optimum for us in CD-DVD systems. Kibabayashi 501 explains that beams of a circular cross-sectional shape are preferable in CD-DVD systems, and the Kibabayashi 501 reference provides a required Prism (3) in its system that is designed to make changes to one of the two beams which is of a specific wavelength, to make it be substantially circular in cross-section. Importantly, nothing in Kibabayashi 501 remotely suggests removing said Prism (3) as to do so would render the Kibabayashi 501 system inoperable, and nothing in the present invention remotely suggests the presence of such a beam shaping element. However, necessary as it is in Kibabayashi 501, said prism (3) does not operate so successfully at a second wavelength, and this is why the Kibabayashi 501 reference provides for its dichroic, (ie. wavelength absorbing), filter (63) to also be present. Said dichroic filter makes the second wavelength beam substantially circular by presenting an esentially elliptical shape filter region therein to the beam. Also importantly, said Kibabayashi 501 dichroic filter (63) is designed to, at said second wavelength, provide a substantially circular beam exiting therefrom which was not fully affected by that Prism therein (3). It's presence does NOT serve to act on a multiplicity of wavelengths without need of additional elements as does the filter in the present invention, as will be discused in the Disclosure Section of the Specification.

It is also of interest to consider that Kibabayashi 501 inventor could beneficially add the present invention to its system to provide optimized beam diameters at the two wavelengths it uses for CD and DVD operation. However, Kibabayashi 501 does not remotely suggest this at all, as it does not even mention correcting for diffraction of a beam.

Finally, Patents disclosing other approaches, (eg. apodizing filters, spatial filters, graded lens etc.), to improving imaging performance in metrology systems by adjusting the index of lens material index are:

U.S. Pat. No. 5,859,424 to Norton;
U.S. Pat. No. 6,738,138 to Wei;
U.S. Pat. No. 7,145,654 to Norton; and
U.S. Pat. No. 7,050,162.

Need exists for a system which provides wavelength specific material response mediated aperturing and focusing of electromagnetic beams, on a wavelength by wavelength basis, to the end that an optimum beam diameter, in view of both diffraction and aberration effects is approached over a range of wavelengths so that the operation of the lens element is improved.

DISCLOSURE OF THE INVENTION

The present invention is a system for improving the operation of a focusing element as a function of wavelength, to improve the performance of the focusing element. Said system comprises, in either order:

a) a focusing element for focusing an electromagnetic beam, selected from the group consisting of:
  a lens; and
  a lens system comprising at least two elements; and
b) a filtering element for naturally adjusting the effective cross-sectional area of a transmitted beam of electromagnetic radiation, as a function of wavelength for a multiplicity thereof, said focusing element and said filtering element being functionally associated.
(Note that said element for focusing an electromagnetic beam does not require any additional, beam shaping, elements).

The design criteria of said filtering element is that the effective cross-sectional area of the electromagnetic beam passed by said filtering element to said focusing element is naturally adjusted with respect to wavelength, such that the performance of the focusing element is rendered approximately optimum in view of an inherent tradeoff between diffraction and aberration effects as a function of electromagnetic beam cross-sectional area.

The filtering element can absorb electromagnetic radiation of some wavelengths but not others, can reflect electromagnetic radiation of some wavelengths but not others, and/or scatter electromagnetic radiation of some wavelengths but not others.

The filtering element performs at least two selections from the group consisting of:
  it passes;
  it reflects;
  it scatters;
electromagnetic radiation of some wavelengths but not others.

For each wavelength, the focusing element aberration effects increase with the effective cross-sectional area of a beam of electromagnetic radiation directed thereto, and for each wavelength, focusing element diffraction effects decrease with the effective cross-sectional area of a beam of electromagnetic radiation directed thereto.

The effective cross-sectional area of a beam of electromagnetic radiation directed thereto, is naturally adjusted by said filtering element to be approximately optimum based on determining a cross-over point between increasing aberration and decreasing diffraction effects as a function of said cross-sectional area, for at least one wavelength.

The cross-sectional area can be of a shape selected from the group consisting of:
  circular;
  square;
  rectangular;
  oval; and
  elliptical;
wherein progressively greater "effective radii" can be defined, referenced to a common origin. Different materials can be present between adjacently positioned radii.

The focusing element and filtering element can comprise a modular lens and a modular filtering element, or can comprise an integrated lens and filtering element.

The focusing element and filtering element can comprise a modular lens system comprising at least two modular lens elements and at least one modular filtering element positioned at a location selected from the group:
  before a lens element;
  after a lens element;
  between said at least two lens elements.

The focusing element and filtering element can comprise a modular lens system comprising at least two modular lens elements and at least one filtering element integrated into at least one of said lens elements at a location selected from the group:
  before said lens element;
  after said lens element.

The focusing element and filtering element can comprise a modular lens system comprising at least two modular lens elements, and at least one filtering element integrated into both lens elements, each thereof being at a location selected from the group:
  before said lens element;
  after said lens element.

The filtering element can be of a constant thickness over its area, or not of a constant over its area, and/or can comprise at least two concentric regions of different materials, wherein a first material is present between a first effective radius and a second greater radius, and a second material is present between said second radius and a third even greater effective radius, all centered about a common origin.

As a relevant application of a present invention system as described above is in ellipsometer and polarimeter or the like systems, it is disclosed that such systems comprise:
  a source of electromagnetic radiation;
  a polarization state generator;
  a stage for supporting a sample;
  a polarization state analyzer; and
  a data detector.
Said ellipsometer, polarimeter or the like system further comprises, at least prior to said stage for supporting a sample
  a system for improving the oprartion of a focusing element as a function of wavelength, to improve the performance of the focusing element comprising, in either order:
    a) a focusing element for focusing an electromagnetic beam, selected from the group consisting of:
      a lens; and
      a lens system comprising at least two elements; and
    b) a filtering element for naturally adjusting the effective cross-sectional area of a transmitted beam of electromagnetic radiation, as a function of wavelength for a multiplicity thereof;
said focusing element and said filtering element being functionally associated.

(Note that said element for focusing an electromagnetic beam does not require any additional, beam shaping, elements).

The design criteria of said filtering element is that the effective cross-sectional area of the electromagnetic beam passed by said filtering element to said focusing element is naturally adjusted with respect to wavelength, such that the performance of the focusing element is rendered approximately optimum in view of an inherent tradeoff between diffraction and aberration effects as a function of electromagnetic beam cross-sectional area.

The filtering element can absorb electromagnetic radiation of some wavelengths but not others.

The filtering element can reflect electromagnetic radiation of some wavelengths but not others.

The filtering element can scatter electromagnetic radiation of some wavelengths but not others.

The filtering element can perform at least two selections from the group consisting of:
  it passes;
  it reflects;
  it scatters;
electromagnetic radiation of some wavelengths but not others, wherein, for each wavelength, focusing element aberration effects increase with the effective cross-sectional area of a beam of electromagnetic radiation directed thereto and wherein for each wavelength, focusing element diffraction effects decrease with the effective cross-sectional area of a beam of electromagnetic radiation directed thereto.

The effective cross-sectional area of a beam of electromagnetic radiation directed thereto, is then naturally adjusted by said filtering element to be approximately optimum based on determining a cross-over point between increasing aberration and decreasing diffraction effects as a function of said cross-sectional area, for at least one wavelength.

The focusing element and filtering element can comprise a modular lens and a modular filtering element.

The focusing element and filtering element can comprise an integrated lens and filtering element.

The focusing element and filtering element can comprise a modular lens system comprising at least two modular lens elements and at least one modular filtering element positioned at a location selected from the group:
  before a lens element;
  after a lens element;
  between said at least two lens elements.

The focusing element and filtering element can comprise a modular lens system comprising at least two modular lens elements and at least one filtering element integrated into at least one of said lens elements at a location selected from the group:
  before said lens element;
  after said lens element.

The focusing element and filtering element can comprise a modular lens system comprising at least two modular lens elements, and at least one filtering element integrated into both lens elements, each thereof being at a location selected from the group:
  before said lens element;
  after said lens element.

The filtering element can be of a constant thickness over its area, or not constant over its area and/or can comprise at least two concentric regions of different materials, wherein a first material is present between a first effective radius and a second greater radius, and a second material is present between said second radius and a third even greater effective radius, all centered about a common origin.

It is mentioned that one way of thinking about the present invention filtering element, is that it is a wavelength dependent system for naturally adjusting a numerical aperture size. And, note that the present invention provides the same filtering characteristics at each radial circumference through a 360 degree rotation about said common origin.

The present invention will be better understood by reference to the Detailed Description Section of this Specification, in combination with the Drawings.

BRIEF DESCRIPTION OF THE DRAWINGS

FIGS. 1a1 and 1a2 show an aperture which is made from various materials at various radial extents.

FIG. 2a1 shows a side view of a modular lens (L) with an aperture (AP) placed just therebefore.

FIG. 2a2 shows a side view of an integrated lens (L) and aperture (AP).

FIG. 2a3 a lens (L) can be a lens system comprising a plurality of elements.

FIG. 2b1 shows a front view of a circular lens (L) and aperture (AP).

FIGS. 2b2-2b5 show front views of various alternative lens shapes.

FIG. 3 shows a plot of beam energy as a function of aperture (AP) Radius (r).

FIG. 5 demonstrates an ellipsometer and polarimeter (E) or the like system.

DETAILED DESCRIPTION

Turning now to the Drawings, FIG. 1a1 shows an aperture (AP) which is made from various materials at various radial (r) extents. Radius (r1) identifies a opening through which a electromagnetic radiation of a given wavelength can pass. Radius (r2) shows a region of the aperture, outside the radius (r1), which is made of material (A), and radius (r3) shows a region beyond radius (r2) which is a beam stopper (ST). FIG. 1a2 also shows that the aperture (AP) can comprise additional areas made of various other materials, (eg. (MB) between r1 and r4). Additional concentric rings of different materials can be present and the Drawings are to be considered demonstrative and not limiting. A similar plot results for each wavelength. Further, note that the material present between indicated radii r1 and r2 is the same through said 360 degrees, as is the different material between radii r2 and r4. Support for this is found in the present Application FIGS. 1a1 and 1a2. It is noted that this is very different than what is disclosed by Kibabayashi 501 FIG. 3 which shows that the dichroic filter thereof has an elliptical shaped filter region in order to shape an elliptical shaped beam to be more circular. There is no similar motivation for such filter design in the present invention. The motivation for the present invention filtering approach is that there is a tradeoff between diffraction and aberration effects as a function of electromagnetic beam cross-sectional area presented to a lens focusing element, and this cross-sectional area tradeoff varies with wavelength. The filtering material in the present invention serves to fashion beam cross-sectional diameter so that, for each wavelength present therewithin, the diameter, and hence cross-sectional beam area, is approximately optimum in view of how a focusing element handles it. And further note that Kibabayashi 501 does not even mention beam diffraction.

Figure 1B:
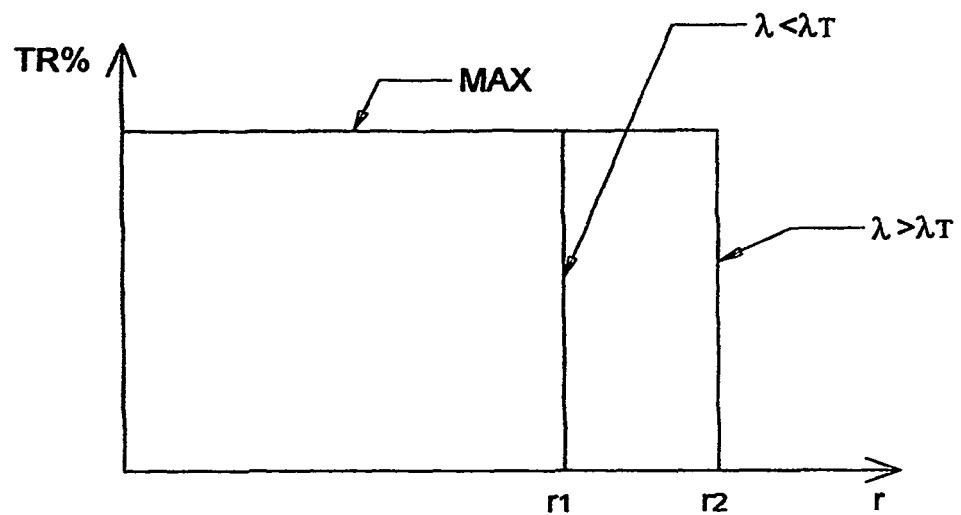
FIG. 1b shows that different wavelengths "see" a different aperture (AP) cross-sectional area
Figure 1C:
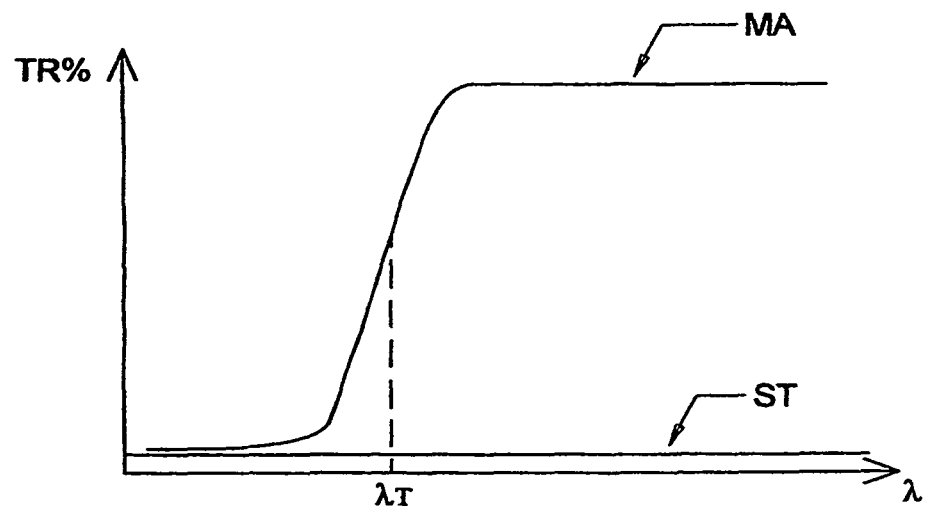
FIG. 1c shows transmission characteristics for materials (A) and (ST) in FIG. 1a which result in FIG. 1b operational characteristics.

FIG. 1c is shows transmission characteristics for material (A) and beam stopper (ST) in FIG. 1a1 which result in FIG. 1b operational characteristics. FIG. 1b shows that different wavelengths "see" a different aperture (AP) cross-sectional area, (eg. an opening radius varies between (r1) and (r2) with wavelength). This is because of the wavelength dependent response of material (A). It will be appreciated that Figures like FIGS. 1b and 1c, but for a FIG. 1a2 embodiment also result, but with different Percent of Transmission (TR %) for the region between (r4) and (r2) based on the characteristics of material (ST). Any number of such Figures result based on the number of regions of different Materials, (eg. (MA), (Mb) and additional (Mc) etc.), and it is not believed necessary to show a multiplicity of embodiments in view of the examples provided by FIGS. 1A1, 1A2, 1b and 1c.

Figure 5:
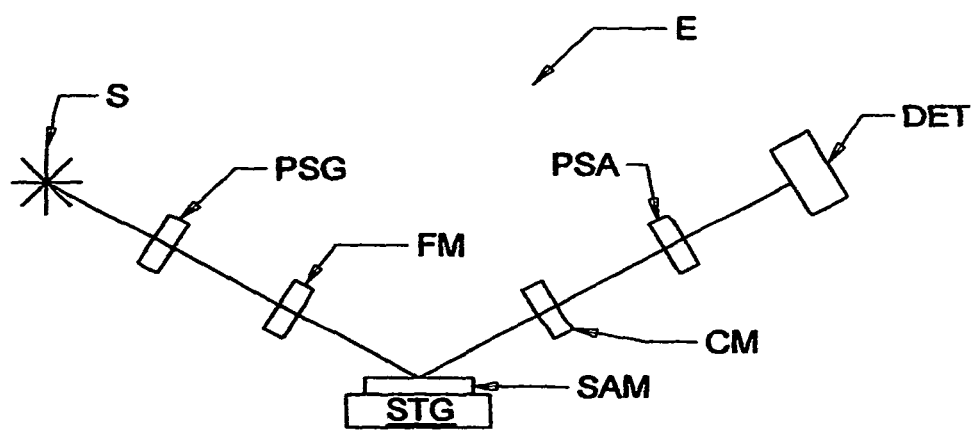

FIG. 2a1 shows a side view of a Lens (L) with an aperture (AP) placed just therebefore. FIG. 2b1 shows a front view of said lens (L) and aperture (AP). As indicated by FIGS. 1a1-1c, the aperture (AP) diameter (D) varies with wavelength. FIGS. 2b2-2b5 show front views of various alternative lens shapes, namely square, rectangular, oval and elliptical. FIG. 2a2 shows that the lens (L) and aperture (AP) can be merged into an integrated embodiment. Both the FIG. 2a1 modular, and FIG. 2a2 integrated embodiments are disclosed as the Present Invention in this Disclose. FIG. 2a3 demonstrates that, for the purpose of this disclosure, a lens (L) can be, but need not be, a lens system comprising a plurality of elements, (eg. at least (LA) and (LB) elements). FIG. 2a3 also demonstrates that an aperture (AP) (AP') (AP") can alternatively be placed either before (AP) or after (AP') a Lens (LA), or between (AP") two elements (LA) (LB), or simultaneously at any selected multiple of said locations. This is the case regardless of the number of Lenses and Filters present. Note, FIG. 2a3 is not to be interpreted to imply that a lens system can not be comprised of more than two elements.

Figure 2C:
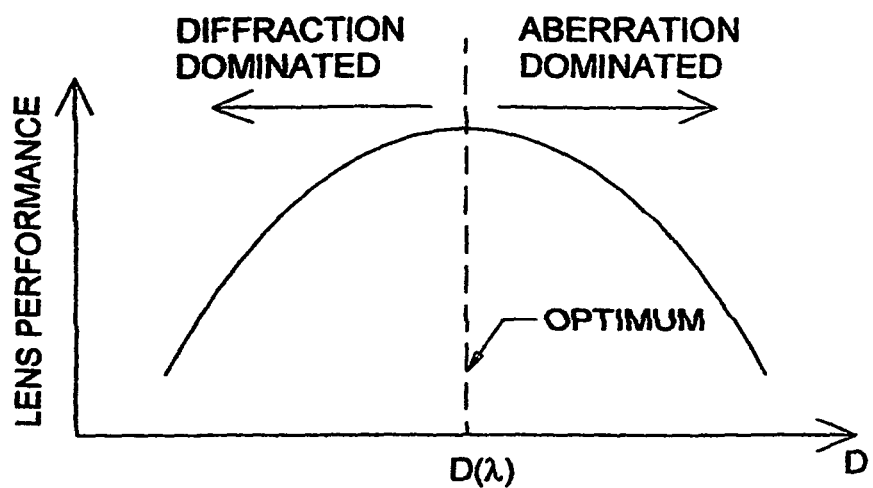
FIG. 2c shows the primary desired effect of the present invention.
Figure 3:
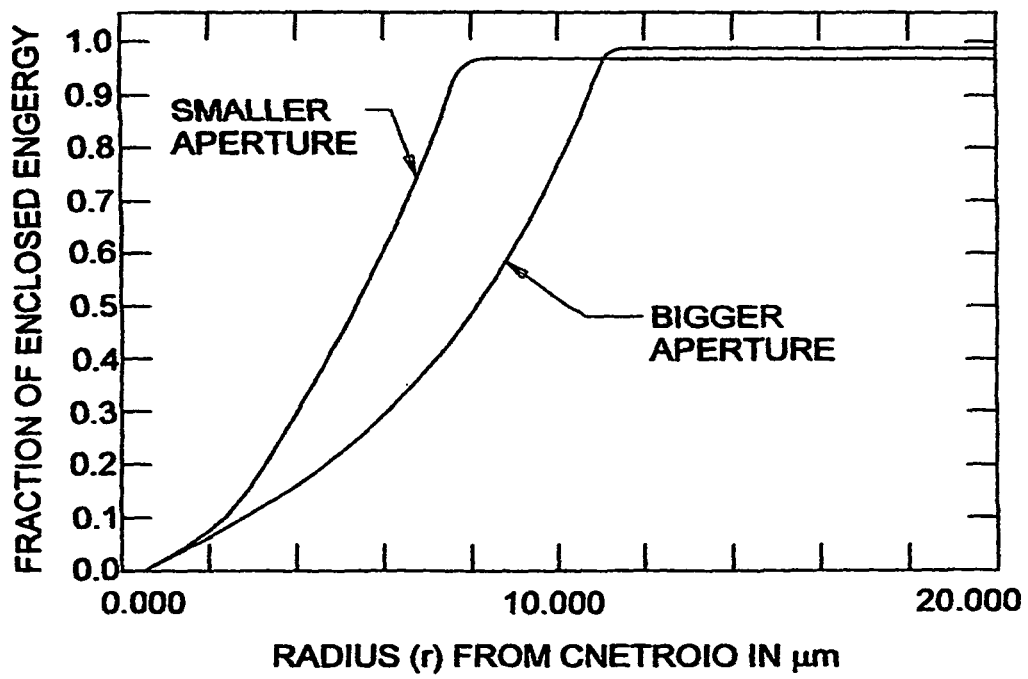

FIG. 2c shows the primary desired effect of the present invention. Such a plot will exist for each wavelength. Note that a lens performance criteria is optimized in view of offsetting aberration and diffraction effects. Changing the Diameter (D) to make it larger or smaller results in a lessened Lens Performance.

FIG. 3 shows a plot of beam energy as a function of aperture (AP) radius (r).

Figure 4:
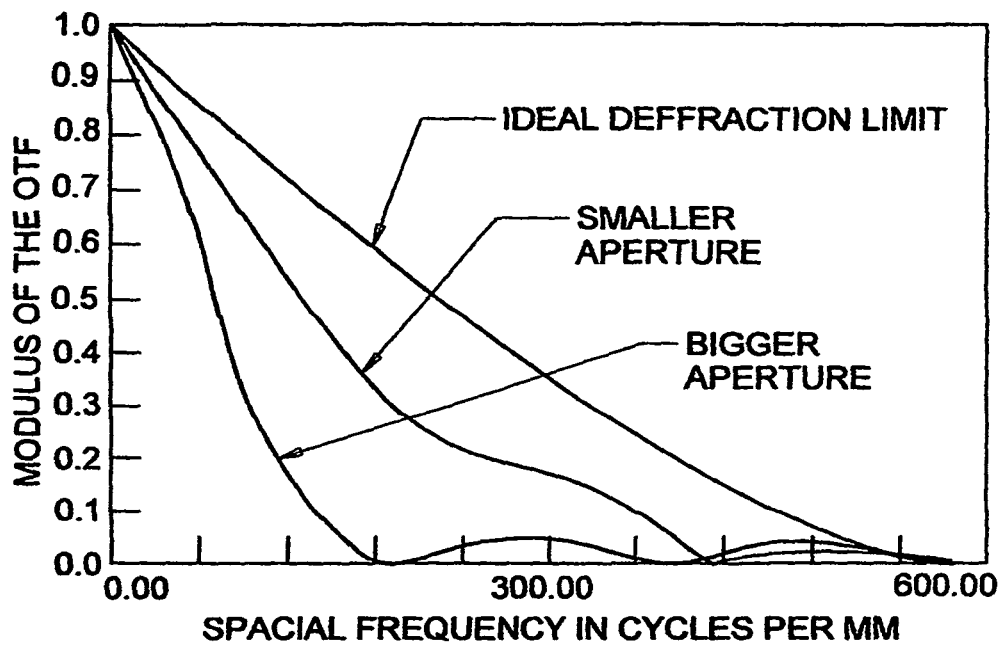
FIG. 4 demonstrates how aperture (PA) opening radius (r) affects resolution capability.

FIG. 4 demonstrates how aperture (AP) opening radius (r) affects resolution capability.

FIG. 5 demonstrates that an ellipsometer and polarimeter or the like system (E) generally comprises a source (S) of electromagnetic radiation, a polarization state generator (PSG), a stage (STG) for supporting a sample (SAM), a polarization state analyzer (PSA) and a data detector (DET). The polarization state generator (PSG) and polarization state analyzer (PSA) can each comprise a polarizer or analyzer respectively, and either can further comprise a compensator. Note that focusing (FM) and collimating (CM) are also shown. The present invention FIGS. 2a1 2a2 and 2a3 refractive lens (L) and aperture (A) (A') (A") can be applied at these locations.

It is noted that the terminology "naturally adjusted" as used in this Disclosure is to be interpreted to mean that a fliter material optically responds to different wavelengths differently, so that an effective aperture diameter, and therefore the cross-sectional area of a beam of electromagnetic radiation interacting with an associated focusing element, is different for different wavelengths. The purpose being to provide a beam cross-sectional area which is more "optimum" in view conflicting aberration and diffraction criteria, and therefore improve the operation of the focusing element.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A system for improving the operation of a focusing element as a function of wavelength for a multiplicity thereof comprising, in either order:
    a) a focusing element for focusing an electromagnetic beam, selected from the group consisting of:
       a lens; and
       a lens system comprising at least two elements; and
    b) a filtering element for naturally adjusting the effective cross-sectional area of a transmitted beam of electromagnetic radiation, as a function of wavelength;
    said element for focusing an electromagnetic beam not requiring any additional, beam shaping, elements;
    said focusing element and said filtering element being functionally associated;
    wherein the design criteria of said filtering element is that the effective cross-sectional area of the electromagnetic beam passed by said filtering element to said focusing element is naturally adjusted with respect to wavelength for each of a multiplicity thereof, such that the performance of the focusing element is rendered approximately optimum in view of an inherent tradeoff between diffraction and aberration effects as a function of electromagnetic beam cross-sectional area;
    wherein the terminology "naturally adjusted" means that a filter material optically responds to different wavelengths differently, so that an effective diameter, and therefore the cross-sectional area of a beam of electromagnetic radiation interacting with an associated focusing element, is different for different wavelengths.

2. A system as in claim 1, wherein the filtering element absorbs electromagnetic radiation of some wavelengths but not others.

3. A system as in claim 1, wherein the filtering element reflects electromagnetic radiation of some wavelengths but not/others.

4. A system as in claim 1, wherein the filtering element scatters electromagnetic radiation of some wavelengths but not others.

5. A system as in claim 1, wherein the filtering element performs at least two selections from the group consisting of:
    it passes;
    it reflects;
    it scatters;
electromagnetic radiation of some wavelengths but not others.

6. A system as in claim 1, wherein, for each wavelength, focusing element aberration effects increase with the effective cross-sectional area of a beam of electromagnetic radiation directed thereto.

7. A system as in claim 1, wherein, for each wavelength, focusing element diffraction effects decrease with the effective cross-sectional area of a beam of electromagnetic radiation directed thereto.

8. A system as in claim 1 wherein the effective cross-sectional area of a beam of electromagnetic radiation directed thereto, is naturally adjusted by said filtering element to be approximately optimum based on determining a cross-over point between increasing aberration and decreasing diffraction effects as a function of said cross-sectional area, for at least one wavelength.

9. A system as in claim 1, wherein the cross-sectional area is of a shape selected from the group consisting of:
   circular;
   square;
   rectangular;
   oval; and
   elliptical.

10. A system as in claim 1, wherein the focusing element and filtering element comprise a modular lens and a modular filtering element.

11. A system as in claim 1, wherein the focusing element and filtering element comprise an integrated lens and filtering element.

12. A system as in claim 1, wherein the focusing element and filtering element comprise a modular lens system comprising at least two modular lens elements and at least one modular filtering element positioned at a location selected from the group:
   before a lens element;
   after a lens element;
   between said at least two lens elements.

13. A system as in claim 1, wherein the filtering element is of a constant thickness over its area.

14. A system as in claim 1, wherein the filtering element thickness is not a constant over its area.

15. A system as in claim 1, wherein the filtering element comprises at least two concentric regions of different materials, wherein a first material is present between a first effective radius and a second greater radius, and a second material is present between said second radius and a third even greater effective radius, all centered about a common origin.

16. A system as in claim 1, in which said multiplicity of wavelengths are in a continuous spectroscopic range thereof.

17. A system as in claim 1, wherein the focusing element and filtering element comprise a modular lens system comprising at least two modular lens elements and at least one filtering element integrated into at least one of said lens elements at a location selected from the group:
   before said lens element;
   after said lens element.

18. A system as in claim 17, wherein the focusing element and filtering element comprise a modular lens system comprising at least two modular lens elements, and at least one filtering element integrated into both lens elements, each thereof being at a location selected from the group:
   before said lens element;
   after said lens element.

19. An ellipsometer or polarimeter system comprising:
   a source of electromagnetic radiation;
   a polarization state generator;
   a stage for supporting a sample;
   a polarization state analyzer; and
   a data detector;
said ellipsometer or polarimeter system further comprising, at least prior to said stage for supporting a sample
   a system for improving the operation of a focusing element as a function of wavelength for a multiplicity thereof, to improve the performance of the focusing element comprising, in either order:
   a) a focusing element for focusing an electromagnetic beam, selected from the group consisting of:
      a lens; and
      a lens system comprising at least two elements; and
   b) a filtering element for naturally adjusting the effective cross-sectional area of a transmitted beam of electromagnetic radiation, as a function of wavelength;
said element for focusing an electromagnetic beam not requiring any additional, beam shaping, elements;
said focusing element and said filtering element being functionally associated;
wherein the design criteria of said filtering element is that the effective cross-sectional area of the electromagnetic beam passed by said filtering element to said focusing element is naturally adjusted with respect to wavelength for each of a multiplicity thereof, such that the performance of the focusing element is rendered approximately optimum in view of an inherent tradeoff between diffraction and aberration effects as a function of electromagnetic beam cross-sectional area;
wherein the terminology "naturally adjusted" means that a filter material optically responds to different wavelengths differently, so that an effective diameter, and therefore the cross-sectional area of a beam of electromagnetic radiation interacting with an associated focusing element, is different for different wavelengths.

20. A system as in claim 19, wherein the filtering element absorbs electromagnetic radiation of some wavelengths but not others.

21. A system as in claim 19, wherein the filtering element reflects electromagnetic radiation of some wavelengths but not others.

22. A system as in claim 19, wherein the filtering element scatters electromagnetic radiation of some wavelengths but not others.

23. A system as in claim 19 wherein the filtering element performs at least two selections from the group consisting of:
   it passes;
   it reflects;
   it scatters;
electromagnetic radiation of some wavelengths but not others.

24. A system as in claim 19, wherein, for each wavelength, focusing element aberration effects increase with the effective cross-sectional area of a beam of electromagnetic radiation directed thereto.

25. A system as in claim 19, wherein, for each wavelength, focusing element diffraction effects decrease with the effective cross-sectional area of a beam of electromagnetic radiation directed thereto.

26. A system as in claim 19 wherein the effective cross-sectional area of a beam of electromagnetic radiation directed thereto, is naturally adjusted by said filtering element to be approximately optimum based on determining a cross-over point between increasing aberration and decreasing diffraction effects as a function of said cross-sectional area, for at least one wavelength.

27. A system as in claim 19, wherein the focusing element and filtering element comprise a modular lens and a modular filtering element.

28. A system as in claim 19, wherein the focusing element and filtering element comprise an integrated lens and filtering element.

29. A system as in claim 19, wherein the focusing element and filtering element comprise a modular lens system comprising at least two modular lens elements and at least one modular filtering element positioned at a location selected from the group:
   before a lens element;
   after a lens element;
   between said at least two lens elements.

30. A system as in claim 19 wherein the filtering element is of a constant thickness over its area.

31. A system as in claim 19 wherein the filtering element thickness is not a constant over its area.

32. A system as in claim 19, wherein the filtering element comprises at least two concentric regions of different materials, wherein a first material is present between a first effective radius and a second greater radius, and a second material is present between said second radius and a third even greater effective radius, all centered about a common origin.

33. A system as in claim 19, in which said multiplicity of wavelengths are in a continuous spectroscopic range thereof.

34. A system as in claim 19, wherein the focusing element and filtering element comprise a modular lens system comprising at least two modular lens elements and at least one filtering element integrated into at least one of said lens elements at a location selected from the group:
- before said lens element;
- after said lens element.

35. A system as in claim 34 wherein the focusing element and filtering element comprise a modular lens system comprising at least two modular lens elements, and at least one filtering element integrated into both lens elements, each thereof being at a location selected from the group:
- before said lens element;
- after said lens element.

36. A system for naturally improving the operation of a focusing element as a function of wavelength for a multiplicity thereof comprising, in either order:
a) a focusing element for focusing an electromagnetic beam, selected from the group consisting of:
a lens; and
a lens system comprising at least two elements; and
b) a filtering element for naturally adjusting the effective cross-sectional area of a transmitted beam of electromagnetic radiation, as a function of wavelength;
said focusing element and said filtering element being functionally associated;
wherein the design criteria of said filtering element is that the effective cross-sectional area of the electromagnetic beam passed by said filtering element to said focusing element is naturally adjusted with respect to wavelength for a multiplicity thereof, such that the performance of the focusing element is rendered approximately optimum in view of an inherent tradeoff between diffraction and aberration effects as a function of electromagnetic beam cross-sectional area;
wherein the terminology "naturally adjusted" means that a filter material optically responds to different wavelengths differently, so that an effective diameter, and therefore the cross-sectional area of a beam of electromagnetic radiation interacting with an associated focusing element, is different for different wavelengths;
said system being characterized by a selection form the group consisting of:
the focusing element and filtering element comprise a modular lens system comprising at least two modular lens elements and at least one modular filtering element positioned at a location selected from the group:
before a lens element;
after a lens element;
between said at least two lens elements; and
the focusing element and filtering element comprise a modular lens system comprising at least two modular lens elements and at least one filtering element integrated into at least one of said lens elements at a location selected from the group:
before said lens element;
after said lens element.

37. An ellipsometer or polarimeter system comprising:
a source of electromagnetic radiation;
a polarization state generator;
a stage for supporting a sample;
a polarization state analyzer; and
a data detector;
said ellipsometer or polarimeter system further comprising, at least prior to said stage for supporting a sample
a system for improving the operation of a focusing element as a function of wavelength for a multiplicity thereof comprising, in either order:
a) a focusing element for focusing an electromagnetic beam, selected from the group consisting of:
a lens; and
a lens system comprising at least two elements; and
b) a filtering element for naturally adjusting the effective cross-sectional area of a transmitted beam of electromagnetic radiation, as a function of wavelength;
said focusing element and said filtering element being functionally associated;
wherein the design criteria of said filtering element is that the effective cross-sectional area of the electromagnetic beam passed by said filtering element to said focusing element is naturally adjusted with respect to wavelength, such that the performance of the focusing element is rendered approximately optimum in view of an inherent tradeoff between diffraction and aberration effects as a function of electromagnetic beam cross-sectional area;
wherein the terminology "naturally adjusted" means that a filter optically responds to different wavelengths differently, so that an effective diameter, and therefore the cross-sectional area of a beam of electromagnetic radiation interacting with an associated focusing element, is different for different wavelengths;
said system being characterized by a selection form the group consisting of:
the focusing element and filtering element comprise a modular lens system comprising at least two modular lens elements and at least one modular filtering element positioned at a location selected from the group:
before a lens element;
after a lens element;
between said at least two lens elements; and
the focusing element and filtering element comprise a modular lens system comprising at least two modular lens elements and at least one filtering element integrated into at least one of said lens elements at a location selected from the group:
before said lens element;
after said lens element.

38. A system for improving the operation of a focusing element as a function of wavelength for amultiplicity thereof, comprising, in either order:
a) a focusing element for focusing an electromagnetic beam, selected from the group consisting of:
a lens; and
a lens system comprising at least two elements; and
b) a filtering element for naturally adjusting the effective cross-sectional area of a transmitted beam of electromagnetic radiation, as a function of wavelength;
said focusing element and said filtering element being functionally associated;
wherein the design criteria of said filtering element is that the effective cross-sectional area of the electromagnetic beam passed by said filtering element to said focusing element is naturally adjusted with respect to wavelength, such that the performance of the focusing element is rendered approximately optimum in view of an inherent tradeoff between diffraction and aberration effects as a function of electromagnetic beam cross-sectional area;

wherein the terminology "naturally adjusted" means that a filter material optically responds to different wavelengths differently, so that an effective diameter, and therefore the cross-sectional area of a beam of electromagnetic radiation interacting with an associated focusing element, is different for different wavelengths;

said filtering element being distinguished in that it comprises at least two concentric regions of different materials, wherein a first material is present between a first effective radius and a second greater radius, and a second material is present between said second effective radius and a third even greater effective radius, all centered about a common origin, thereby providing the same filtering characteristics at each radial circumference through a 360 degree rotation about said common origin.

39. An ellipsometer or polarimeter system comprising:
  a source of electromagnetic radiation;
  a polarization state generator;
  a stage for supporting a sample;
  a polarization state analyzer; and
  a data detector;
said ellipsometer of polarimeter system further comprising, at least prior to said stage for supporting a sample
  a system for improving the operation of a focusing element as a function of wavelength for a multiplicity thereof, comprising, in either order:
  a) a focusing element for focusing an electromagnetic beam, selected from the group consisting of:
    a lens; and
    a lens system comprising at least two elements; and
  b) a filtering element for naturally adjusting the effective cross-sectional area of a transmitted beam of electromagnetic radiation, as a function of wavelength;
said focusing element and said filtering element being functionally associated;

wherein the design criteria of said filtering element is that the effective cross-sectional area of the electromagnetic beam passed by said filtering element to said focusing element is naturally adjusted with respect to wavelength, such that the performance of the focusing element is rendered approximately optimum in view of an inherent tradeoff between diffraction and aberration effects as a function of electromagnetic beam cross-sectional area;

wherein the terminology "naturally adjusted" means that a filter material optically responds to different wavelengths differently, so that an effective diameter, and therefore the cross-sectional area of a beam of electromagnetic radiation interacting with an associated focusing element, is different for different wavelengths;

said filtering element being distinguished in that it comprises at least two concentric regions of different materials, wherein a first material is present between a first effective radius and a second greater radius, and a second material is present between said second effective radius and a third even greater effective radius, all centered about a common origin, thereby providing the same filtering characteristics at each radial circumference through a 360 degree rotation about said common origin.

\* \* \* \* \*